US007830820B2

(12) United States Patent
Duke et al.

(10) Patent No.: US 7,830,820 B2
(45) Date of Patent: Nov. 9, 2010

(54) METHOD AND APPARATUS FOR DIRECTIONAL NETWORKING TOPOLOGY MANAGEMENT

(75) Inventors: Martin Huynh Duke, Seattle, WA (US); Guangyu Pei, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 12/017,213

(22) Filed: Jan. 21, 2008

(65) Prior Publication Data

US 2009/0185508 A1   Jul. 23, 2009

(51) Int. Cl.
*H04L 12/28* (2006.01)
(52) U.S. Cl. .................. 370/254; 370/255; 370/351; 709/220; 709/221; 709/222
(58) Field of Classification Search .................. 370/254
See application file for complete search history.

(56) References Cited

U.S. PATENT DOCUMENTS

| | | | | |
|---|---|---|---|---|
| 6,909,700 | B1 * | 6/2005 | Benmohamed et al. | 370/255 |
| 2003/0179742 | A1 * | 9/2003 | Ogier et al. | 370/351 |
| 2007/0002759 | A1 * | 1/2007 | Diaz et al. | 370/252 |
| 2007/0087758 | A1 | 4/2007 | Norris et al. | |

OTHER PUBLICATIONS

Obraczka et al., "A Tool for Massively Replicating Internet Archives: Design, Implementation, and Experience", May 1997, University of Southern California Technical Report, pp. 1-8.
Kotsis, "Interconnection Topologies and Routing for Parallel Processing Systems", Austrian Center for Parallel Computation Technical Report Series, ACPC/TR 92-19, 1992, pp. 1-95.

* cited by examiner

*Primary Examiner*—Pankaj Kumar
*Assistant Examiner*—Gautam Sharma
(74) *Attorney, Agent, or Firm*—Yee & Associates, P.C.; John A. Lepore

(57) ABSTRACT

A computer implemented method, apparatus, and computer program product to managing links in a network. A directional link management system comprises a network manager, a router, a situational awareness database, a neighbor discovery module, a topology manager, and a data link manager. The network manager provides performance parameters for a wireless network. The router routes information to neighbor nodes provides information about links between nodes in the wireless network environment. The situational awareness database stores information about the nodes. The neighbor discovery module detects a presence of a new node. The topology manager identifies a set of links for a node using the set of performance parameters, information about the links, and information about the nodes. The data link manager manages the identified links.

17 Claims, 10 Drawing Sheets

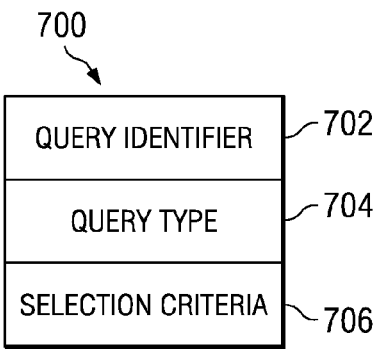
FIG. 7
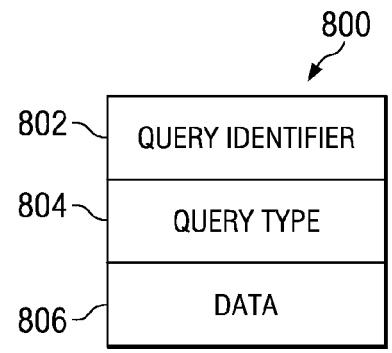
FIG. 8
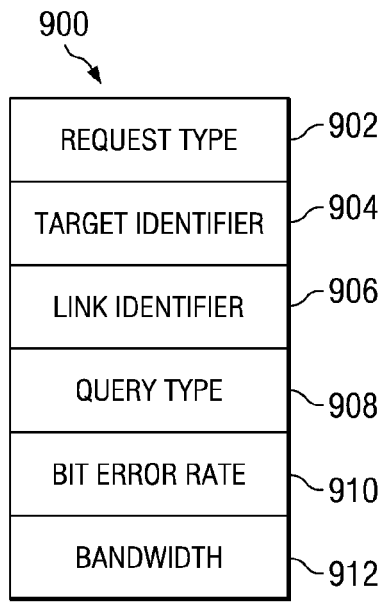
FIG. 9
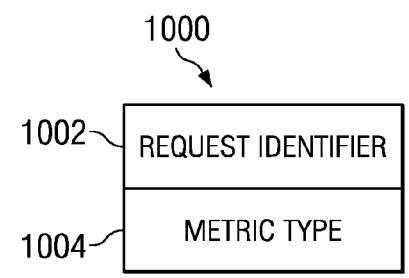
FIG. 10
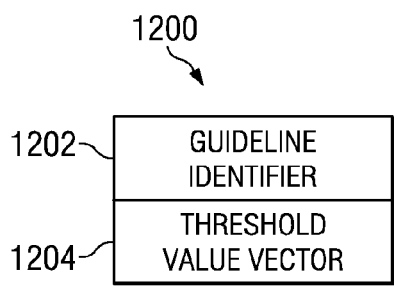
FIG. 12
FIG. 13
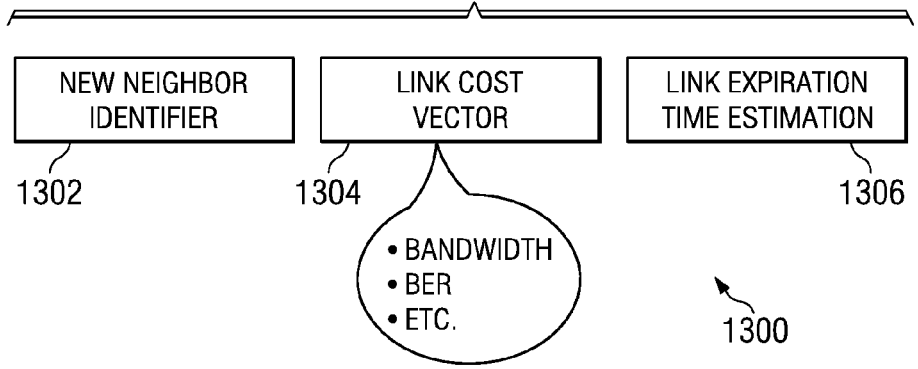

METHOD AND APPARATUS FOR DIRECTIONAL NETWORKING TOPOLOGY MANAGEMENT

BACKGROUND INFORMATION

1. Field

The present disclosure relates generally to communications systems and in particular to a method and apparatus for managing communications between data processing systems. Still more particularly, the present disclosure relates to a method, apparatus, and computer program code for managing directional network links in a communications system.

2. Background

Internet protocols were originally designed for what is referred to as the "wired" Internet. In this environment, physical links exist between routers and other devices in this type of network. Few decisions are to be made about the topology for this type of network except for the original setup or design of these links.

More recently, protocol development has moved to the direction of omni directional wireless networks. In order for a receiver to quickly decode a packet with this type of network, only one transmitter can use a particular frequency and code at a time within the transmission range of the receiver for omni directional wireless networks. Transmission power is limited to allow simultaneous transmissions to increase spatial reuse and minimize power consumption. The transmission power also is limited to reduce the impact on reception of other messages by other nodes.

This type of situation limits the number of neighboring nodes to a relatively small subset of the entire network. Increasing the number of neighbor nodes may unacceptably reduce the capacity of the network. A neighbor node is a node that is capable of directly communicating with the selected node in the network.

Additionally, with this type of network, nodes listen for communication omni directionally. This situation makes it relatively easy to reach nodes to coordinate a communication time. As a result, every node within this type of network is able to directly communicate with any other node in the neighborhood.

When nodes within the network use directional antennas, the situation may change. These directional antennas are typically high gain antennas. A high gain antenna may be chosen with characteristics, such as long communication range, high data rate, anti-jamming features, and low probability of detection.

These types of antennas also minimize interference with other transmissions or communications in the network. The gain is maximized when both the transmitter and receiver direct their antenna beams at each other. This type of directionality reduces interference because the transmissions between a transmitter and receiver may no longer interfere with nodes outside of the transmitter's beam.

In tactical applications, communication ranges of hundreds of kilometers may be achievable. These types of applications may results in hundreds or thousands of nodes being reachable. Forming a link with the different potential neighbor nodes may have a number of different costs.

For example, to effectively aim narrow transmit and receive beams, frequent exchanges of position information between the nodes may be required. These exchanges may reduce the throughput available for communications between the nodes. Further, if the time schedule is quantized into relatively large slots to allow the abstraction of variable signal time of flight, then allocating a large slot to links that have little or no data flow may result in a waste of resources in the network.

Further, with the use of conventional link-state routing protocols, a regular reporting of the existence of links is made to the rest of the network. If each node has many links, the overhead associated with this type of reporting may be unduly burdensome with respect to network resources. If only a few links are actually handling traffic, scheduling unnecessary transmissions also may increase the delay in transmitting data. This situation may result in an increase in the per-hop latency within the network.

Further, with many transmissions in various directions, interference may occur with respect to third parties that are not part of the communications. This type of interference may increase with long range and/or high power transmissions and may reduce the resources available to carry data within a network.

SUMMARY

The advantageous embodiments provide a computer implemented method, apparatus, and computer program product to managing links in a network. In one advantageous embodiment a directional link management system comprises a network manager, a router, a situational awareness database, a neighbor discovery module, a topology manager, and a data link manager. The network manager is capable of providing a set of performance parameters for a wireless network in which directional links are used by a plurality of nodes in the wireless network. The router is capable of routing information to neighbor nodes within the plurality of nodes and is capable of providing information about links between the plurality of nodes in the wireless network environment. The situational awareness database stores information about nodes. The neighbor discovery module is capable of detecting a presence of a new node in addition to the plurality of nodes. The topology manager is capable of identifying a set of links for a node with a set of nodes using the set of performance parameters, information about the links, and information about the nodes to form a set of identified links. The data link manager is capable of managing the set of identified links.

In another advantageous embodiment, an apparatus comprises a node, a topology manager executing on the node, and a data link manager executing on the node. The topology manager is capable of identifying a set of links for the node with a set of neighbor nodes using a set of performance parameters, information about links, and information about nodes to form a set of identified links. The data link manager is capable of managing the set of identified links identified by the topology manager.

In a further advantageous embodiment, a computer implemented method is used for managing links. Responsive to receiving a set of performance parameters, a link is added to a set of links until the set of links meets the set of performance parameters. Responsive to all of the performance parameters in the set of performance parameters being met by the set of links, a selected link is removed from the set of links until the set of performance parameters are no longer met.

In still another advantageous embodiment, a computer program product for managing links comprises a computer readable medium, and program code stored on the computer readable medium. Program code, responsive to receiving a set of performance parameters, is present for adding a link to a set of links until the set of links meets the set of performance parameters. Program code, responsive to all of the performance parameters in the set of performance parameters being met by the set of links, also is present for removing a selected link from the set of links until the set of performance parameters are no longer met.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 7 is an example of a query sent to a situational awareness database in accordance with an advantageous embodiment;

FIG. 8 is a response generated by a situational awareness database in accordance with an advantageous embodiment;

FIG. 9 is a diagram illustrating a data structure used for link request and link responses in accordance with an advantageous embodiment;

FIG. 10 is a diagram illustrating a routing query in accordance with an advantageous embodiment;

FIG. 12 is a diagram of a data structure containing linking guidelines in accordance with an advantageous embodiment;

FIG. 13 is a diagram illustrating information about a new link in accordance with an advantageous embodiment;

DETAILED DESCRIPTION

Figure 1:
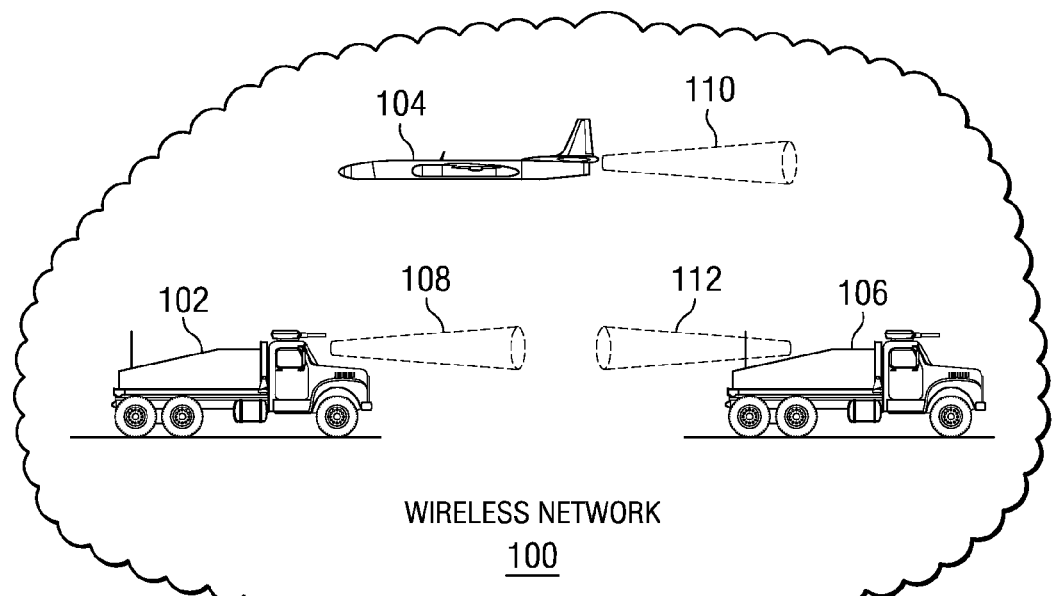
FIG. 1 is a diagram illustrating a directional wireless network environment in which an advantageous embodiment may be implemented.

With reference now to the figures and in particular with reference to FIG. 1, a diagram illustrating a wireless network environment is depicted in accordance with an advantageous embodiment. In this example, wireless network 100 contains nodes 102, 104, and 106. These nodes are mobile nodes within wireless network 100. Nodes 102 and 106 are ground vehicles, while node 104 is an aircraft. Nodes 102, 104, and 106 may be located in various geographic locations.

Wireless network 100 may be, for example, an ad hoc network. An ad hoc network is a network that may be dynamically formed among a group of nodes and requires no existing structure or preconfiguration. An ad hoc network is dynamic and self organizing in nature. These types of features make this type of network particularly useful in situations in which rapid network deployments are required.

In this example, nodes 102, 104, and 106 employ directional links. These nodes are all capable of communicating with each other and may be grouped or called a neighborhood or neighbor nodes. A set of links may be established with a set of neighbor nodes in the neighbor nodes. Nodes 102, 104, and 106 transmitting signals in the form of a beam to form the directional links. For example, node 102 transmits beam 108, node 104 transmits beam 110, and node 106 transmits beam 112. Beams may be transmitted in different configurations within wireless network 100. In these examples, beams 108, 110, and 112 are high-gain narrow beams. In these examples, a beam width is less than around 36 degrees is considered a narrow beam, and a corresponding antenna gain is greater than around 10 dB over omni-directional antennas is considered high gain for either transmitter or receiver.

These beams may be used to transmit and receive information from other nodes. Although high gain narrow beams are illustrated in these examples, other types of beams also may be used. For example, a low energy wide beam also may be used in other embodiments. Nodes 102, 104, and 106 may move and/or position beams to establish and transmit information through directional links with each other. The different advantageous embodiments may be implemented within nodes 102, 104, and 106 to manage these types of links within wireless network 100.

The illustration of wireless network 100 is provided as one example of a wireless network environment. This illustration is not meant to imply architectural limitations on the manner in which wireless network 100 may be implemented. Wireless network 100 also may be referred to as a network.

For example, other numbers of nodes other than three nodes may be present in wireless network 100. For example, some environments may have hundreds or thousands of nodes. Further, these nodes may be located over vast geographic distances. These distances may be, for example, 250 nautical miles. Further, although vehicles and an aircraft are shown in wireless network 100, other types of nodes also may be present in addition to or in place of the depicted nodes.

For example, some mobile nodes may be infantry personnel while other nodes may be ships or submarines. As an additional example of other implementations, wireless network 100 may include a heterogeneous configuration of nodes in which the nodes may use different types of beams for communicating with each other. The nodes may include, for example, at least one of aircraft, ground vehicles, and ships. In other words, the nodes may be just aircraft, just ground vehicles, just ships, or some combination of those types of nodes. The different advantageous embodiments provide a method and apparatus for managing links within a wireless network environment, such as wireless network 100.

Figure 2:
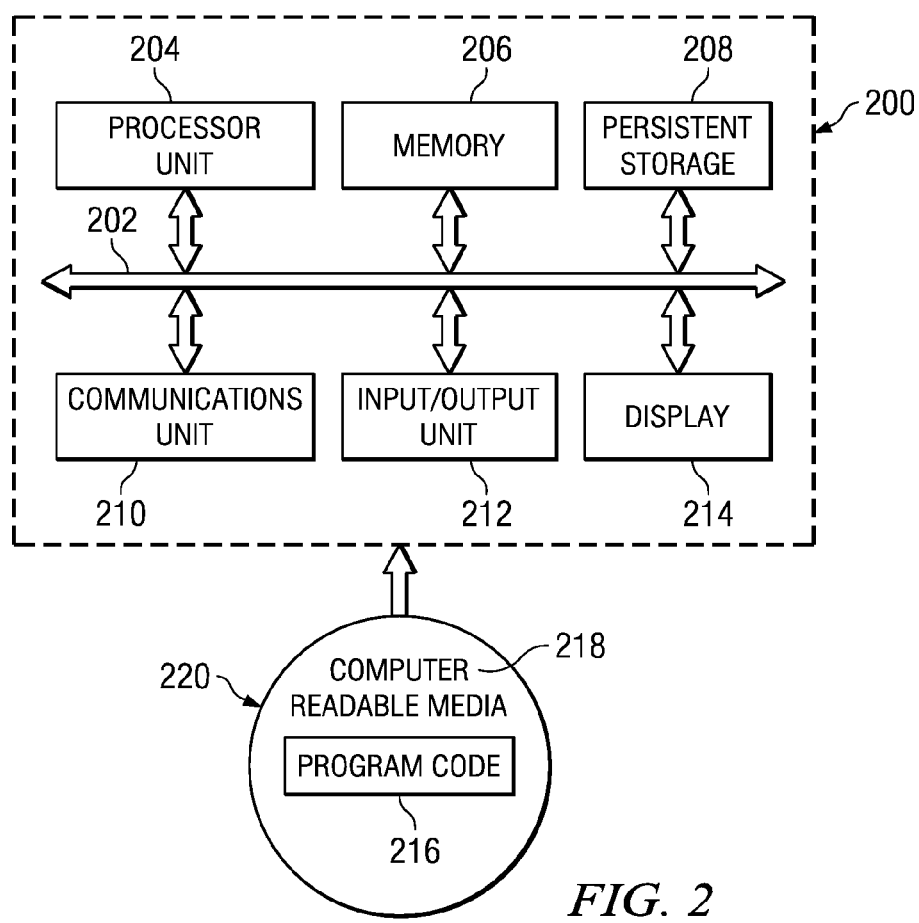
FIG. 2 is a diagram of a data processing system in accordance with an advantageous embodiment.

Turning now to FIG. 2, a diagram of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments provide a computer implemented method, apparatus, and computer usable program code for managing links. In some of the advantageous embodiments, a link is added to a set of links until the set of links meets a set of performance parameters. These performance parameters may, for example, without limitation, provide a specification for desired information transmission. These parameters may include, for example, a number of redundant paths between the nodes and the network, a maximum hop count between the nodes in the network, a desired throughput between the nodes and the network, and any other suitable parameter relating to a transfer of information between nodes and the network.

Figure 3:
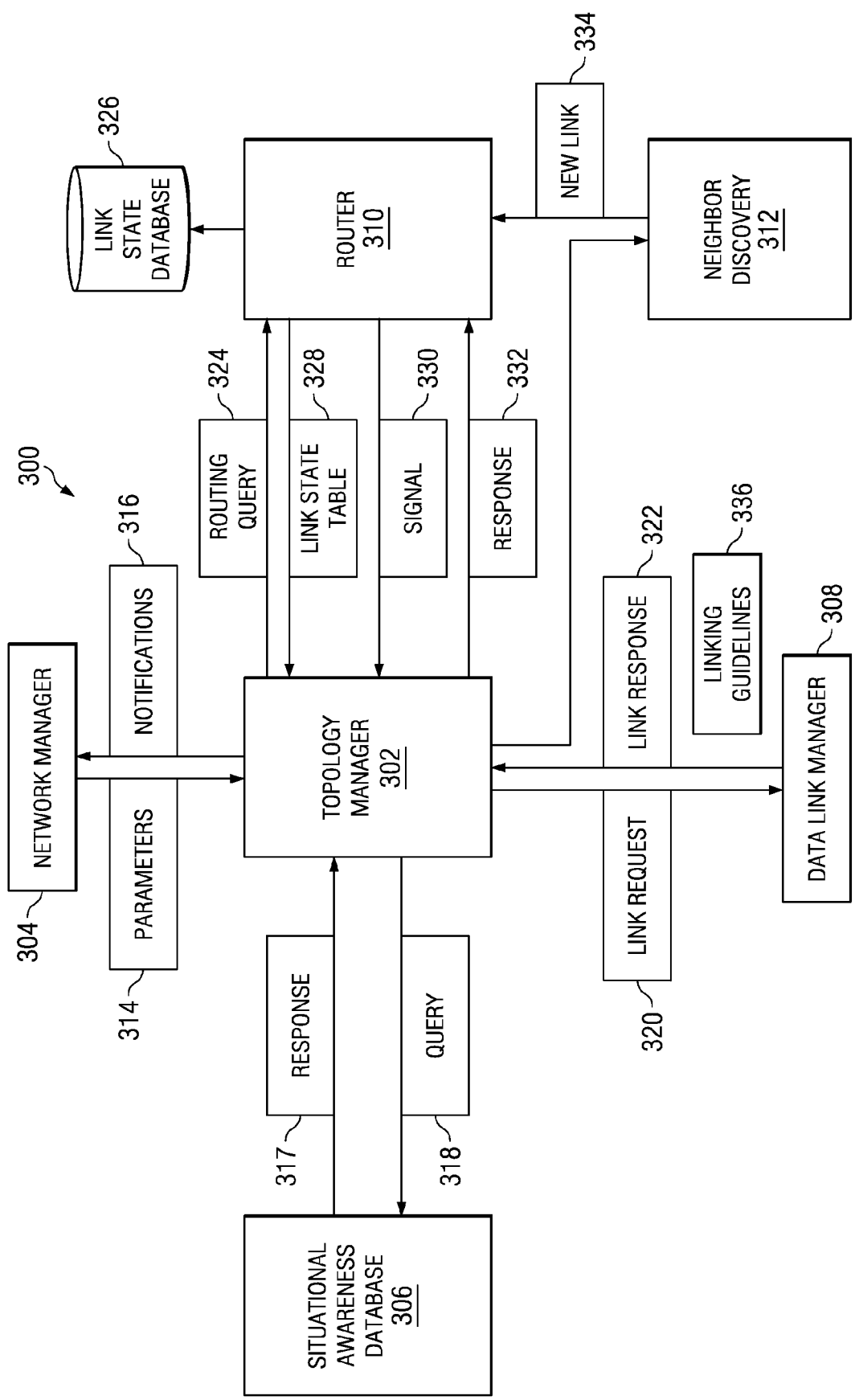
FIG. 3 is a diagram illustrating a directional network link management system in accordance with an advantageous embodiment.

Turning now to FIG. 3, a diagram illustrating a directional network link management system is depicted in accordance with an advantageous embodiment. In this example, directional network link management system 300 is an example of a system that may be implemented within a node, such as node 102 in FIG. 1 using a data processing system, such as data processing system 200 in FIG. 2.

In the different illustrative examples, each node within a wireless network environment may implement directional network link management system 300. Of course, in some embodiments, not all nodes may include this system. Directional network link management system 300 includes topology manager 302, network manager 304, situational awareness database 306, data link manager 308, router 310, and neighborhood discovery 312.

Topology manager 302 contains processes to manage links within a wireless network environment, such as wireless network 100 in FIG. 1. Topology manager 302 is capable of identifying a set of links from a node to a set of nodes within a network using a set of performance parameters. Additionally, topology manager 302 also may use information about the links and information about the nodes to form a set of identified links. These identified links are links from one node to a set of nodes within a network. In these examples, the node is the node in which topology manager 302 executes. Topology manager 302 manages links based on information in parameters received from various components, such as network manager 304, situational awareness database 306, data link manager 308, router 310, and neighborhood discovery 312.

Network manager 304 may function as a user interface or interface to other nodes. Network manager 304 may be operated by a user to provide various performance parameters and instructions for use by topology manager 302. For example, network manager 304 generates a set of performance requirements and sends these performance requirements to topology manager 302 as parameters 314. A performance parameter is a parameter defining a value for a particular metric or measurement about the transfer of information within a network.

Topology manager 302 may return notifications 316 to network manager 304. These notifications may include, for example, an indication that the connectivity requirements between node x and node y are not achievable, and that the algorithm is continuing with a reduced requirement for that node pair. In different advantageous embodiments, network manager 304 also may send performance requirements to other multiple topology managers located in different nodes.

Situational awareness database 306 stores information about nodes within a wireless network environment. This information may include locations of nodes to allow for computing potential link distances. This type of information may be useful for certain heuristic algorithms that may be employed by topology manager 302 for use in managing links with other nodes. Further, other information, such as information about the terrain, also may be used to predict blockages with respect to links.

Topology manager 302 may send queries, such as query 318, to situational awareness database 306. Query 318 may request various information stored within situational awareness database 306. This information may include, for example, information about the location of other nodes, information about terrain for a region, and location and mobility information about the node on which directional network link management system 300 is located. Other information that may be found within situational awareness database 306 may be, for example, a current time.

In response to query 318, situational awareness database 306 provides response 317. This information in response 317 may be used by topology manager 302 in performing link management decisions.

Data link manager 308 controls the links that a node has and executes various commands with respect to managing links for the node. Data link manager 308 is capable of managing the links identified by topology manager 302. For example, data link manager 308 may handle power, code, modulation, beam steering, and slot assignments for the links established by directional network link management system 300.

Data link manager 308 also may perform other functions in managing links. These functions include, for example, deleting a link, forming a link, and adjusting bandwidth. The adjustment of bandwidth may be made by changing power, modulation, and slot assignments to increase or decrease bandwidth. Further, data link manager 308 returns information about the outcome of various requests, in these examples.

Topology manager 302 may send link requests, such as link request 320, to data link manager 308. This link request may be, for example, a request to identify links, delete links, add bandwidth, or reduce bandwidth. Link request 320 may request other information, depending on the particular implementation. In response to the requests, data link manager 308 may perform various operations to return information. The results are returned in link response 322 in these examples.

Also, data link manager 308 may report link states of neighbor nodes to topology manager 302. This information may include, for example, without limitation, queue depth and packet error rates. This type of information about neighbor nodes may be used by topology manager 302 for use in managing links.

Router 310 may also perform other functions. For example, router 310 may identify the next hop for a data packet. A hop is a transmission of information from one node to another node.

Router 310, in these examples, may execute a link-state routing protocol, such as open shortest path first (OSPF). This type of protocol may collect information about the topology of a wireless network environment. In the different illustrative examples, the topology of a wireless network environment is defined by the links between the different nodes within the network. This "topology" may change dynamically during the use of the network. This type of information may be used by topology manager 302 without requiring other requests or messaging overhead.

Router 310 may contain an identification of all existing routes within a wireless network environment. This information includes routes between other nodes than that on which directional network link management system 300 is located.

Topology manager 302 may obtain information about the wireless network environment by sending routing query 324 to router 310. In response to receiving routing query 324, router 310 may generate or retrieve a current routing table from link state database 326. Router 310 may then return link state table 328 for use by topology manager 302. This information is used by topology manager 302 in managing links, in these examples.

Further, topology manager 302 may receive signal 330 from router 310. This signal may be used to inform topology manager 302 of various networking events that may have occurred or that are about to occur. These events include, for example, a partition of the network topology. Topology manager 302 may acknowledge the receipt of actions taken in response to receiving signal 310. Response 332 may be, for example, an acknowledgement that signal 330 has been received or that signal 330 cannot be processed. Of course, other responses may be provided, depending on the particular implementation.

Neighbor discovery 312 is capable of detecting the presence of a new node within the wireless network environment. In these examples, neighbor discovery 312 may scan and search for neighboring nodes. Neighbor discovery 312 may store information about those nodes. Neighbor discovery 312 may store information, such as, for example, a node identifier, a position of the node, mobility headings, and time division multiple access (TDMA) slot bit maps.

Further, neighbor discovery 312 may send information about new links, such as new link 334, to router 310. As new links are identified by neighbor discovery 312, this information is sent to router 310 and stored within link state database 326 in these examples.

Neighbor discovery 312 may discover new links using guidelines, such as linking guideline 336 from topology manager 302. Linking guideline 336 may include information as to where nodes may be present.

The difference is the following. When establishing links via a data link manager, the information about the neighbor node is already known. The link establishment process during the neighbor discovery process is based on guidance from topology manager for unknown new neighbors. The example guidance includes establish links if number of common neighbors is less than a threshold, or signal to noise ratio (SNR) value is greater than threshold, or each node has at least a threshold links to the network. Otherwise, the neighbor discovery module only updates the learned neighborhood set. The establishment during the neighbor discovery process is used for new node to join the network first and allow topology manager to adapt the link later.

The illustration of the different components within directional network link management system 300 is provided as one illustrative implementation or approach for managing links. These different components may be implemented as part of a networking stack within a node. This depicted illustration is not meant to limit the manner in which the different functions and components may be implemented. For example, neighbor discovery 312 may be implemented as part of data link manager 308. Some functions illustrated in the different components may be implemented in other components, depending on the particular implementation.

For example, depending on the particular protocol implemented by router 310, topology manager 302 may obtain its own information about the topology of a network, such as wireless network 100 in FIG. 1. This type of collection of information may be used if router 310 does not run a protocol that collects information about the topology of a network.

Figure 4:
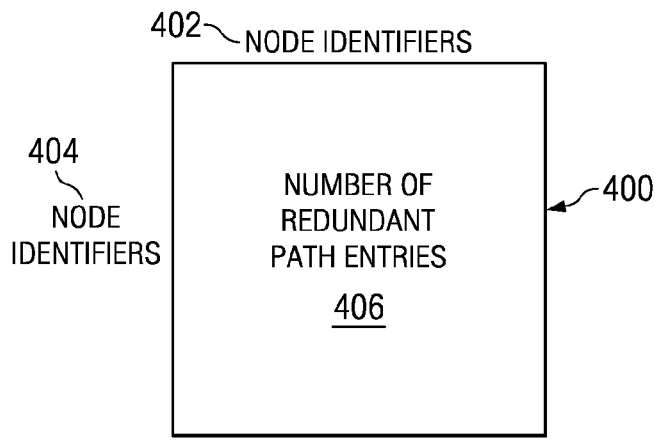
FIG. 4 is a diagram of a connectivity matrix K in accordance with an advantageous embodiment.
Figure 5:
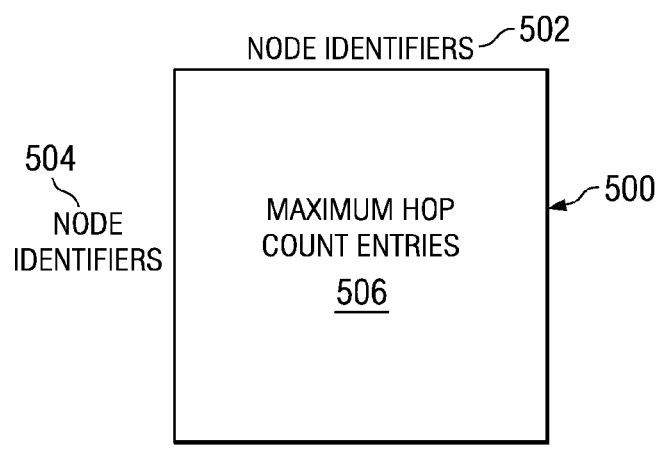
FIG. 5 is a diameter matrix D in accordance with an advantageous embodiment.
Figure 6:
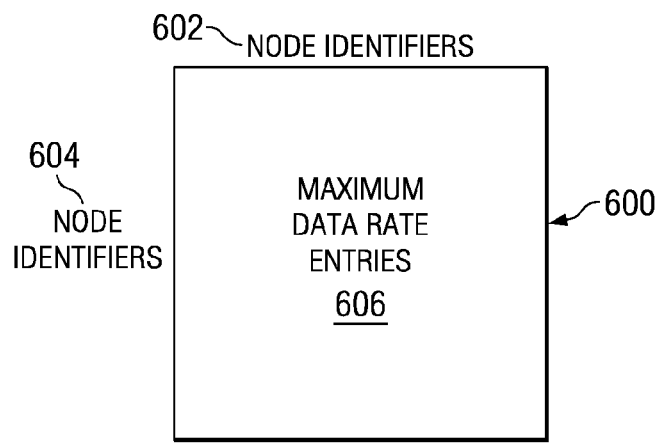
FIG. 6 is a traffic matrix T is depicted in accordance with an advantageous embodiment.

With reference now to FIGS. 4-6, diagrams illustrating performance parameters used by a topology manager to manage directional links are depicted in accordance with an advantageous embodiment. These matrices are examples of data structures that may be sent as parameters 314 from network manager 304 to topology manager 302 in FIG. 3.

In these illustrative examples, network manager 304 in FIG. 3 receives or distributes connectivity matrix K, diameter matrix D, and traffic matrix T to all nodes in the network.

With reference to FIG. 4, a diagram of a connectivity matrix K is depicted in accordance with an advantageous embodiment. Connectivity matrix K 400 is organized as a table with node identifiers 402 for the columns and node identifiers 404 for the rows. In these examples, node identifiers 402 and node identifiers 404 contain an identification of all known nodes within the network. Entries 406 identify a minimum number of redundant paths that is desired between pairs of nodes in the network. Each pair of nodes may have a different number of redundant paths that are desired.

With reference next to FIG. 5, a diameter matrix D is depicted in accordance with an advantageous embodiment. Diameter matrix D 500 is a matrix with node identifiers 502 for columns and node identifiers 504 for rows. These identifiers identify all of the known nodes within the network in these examples. Entries 506 within diameter matrix D 500 specify a maximum hop count between pairs of nodes within the network.

In FIG. 6, a traffic matrix T is depicted in accordance with an advantageous embodiment. In this example, traffic matrix T 600 is a matrix organized in the form of a table with node identifiers 602 for columns and node identifier 604 for rows. Entries 606 within traffic matrix T 600 identifies a minimum data rate between each pair of nodes that the network must support. Further, these data rates may be broken down by priority level within individual entries. In practice, these requirements are likely to be overestimates of the actual traffic flows. A traffic flow is the transfer of flow of information through a link.

The different matrices illustrated in FIGS. 4-6 may be selected or input by a user or operator to provide a greater level of detail and decision with respect to managing directional network links. In the different advantageous embodiments, traffic, capacity, and/or other factors with respect to individual nodes within a network may be used by topology manager 302 in FIG. 3 to manage and optimize the transmission of information within a network, such as wireless network 100 in FIG. 1 in which directional links are present. The use of the term "optimize" in the different advantageous embodiments means to improve performance, but may not require the best performance for a particular parameter.

Although the different examples in FIGS. 4-6 use node identifiers for column and row identifications, other types of identifications may be used. For example, without limitation, node types and a default value for unexpected node arrivals may be used for column and row identifiers.

Topology manager 302 in FIG. 3 uses connectivity matrix K 400, diameter matrix D 500, and traffic matrix T 600 to create and/or manage a set of network links to nodes within a wireless network environment or other type of ad hoc environment to meet the constraints or parameters specified in these matrices. In these examples, the links are from a node in which topology manager 302 in FIG. 3 executes to other nodes within the wireless network environment. This process also take into account a constraint in which nodes may not link with each other if they are out of communications range or do not have an unblocked line of sight.

In the different illustrative examples, topology manager 302 in FIG. 3 may optimize the quantities and parameters, such as minimum total number of links, uniformity in time division multiple access slot utilization and minimum link range. The optimization of these quantities may be in the order as listed as an order of importance from the greatest importance to the least importance. By meeting the constraints and/or requirements in these matrixes, interference between nodes may be reduced as well as saving power and increasing flexibility to respond to new system demands. New system demands may be, for example, introduction of new nodes or the partitioning of the network.

Turning now to FIG. 7, an example of a query sent to a situational awareness database is depicted in accordance with an advantageous embodiment. Query 700 is an example of query 318 in FIG. 3. Query 700 includes query identifier 702, query type 704, and selection criteria 706.

Query identifier 702 uniquely identifies the query generated by topology manager 302 in FIG. 3, in these examples. Query type 704 may identify different types of information that may be queried in situational awareness database 306 in FIG. 3. In these examples, the query types may be self information, time, available nodes, and terrain.

The self information query is for a location on a mobility information for the node in which topology manager 302 in FIG. 3 is located. The time query obtains the current time information from a global positioning system clock, in these examples. Available nodes query the location of mobility information a particular set of nodes. A set, as used in these examples, refers to one or more items. For example, a set of nodes is one or more nodes. A terrain query requests information for a particular region. Selection criteria 706 provides selection criteria for the different types of queries that may be made.

With reference now to FIG. 8, a response generated by a situational awareness database is depicted in accordance with an advantageous embodiment. In this example, response 800 includes query identifier 802, query type 804, and data 806. Query identifier 802 contains the identifier from the query made by the topology manager. The query type indicates the type of information being returned. Data 806 contains the information responsive to the query.

Turning now to FIG. 9, a diagram illustrating a data structure used for link request and link responses is depicted in accordance with an advantageous embodiment. Data structure 900 is an example of a data structure that may be used for link request 320 and link response 322 in FIG. 3. Data structure 900 includes request type 902, target identifier 904, link identifier 906, queue type 908, bit error rate 910, and bandwidth 912.

Request type 902 indicates the type of request that has been made. This type may be identified in both the request and response. Request type 902 may be, for example, a query to identify information, a deletion of a link, an addition of a link, and a request to change bandwidth for a link. Target identifier 904 identifies the node to which the request is directed. Link identifier 906 identifies the particular link from the node in which topology manager 302 in FIG. 3 is present to the link of the target node.

Queue type 908 may identify a particular type of queue located on the target identifier. Bit error rate (BER) 910 indicates the maximum bit error rate acceptable for the link.

Bandwidth 912 identifies the minimum acceptable bandwidth for a link. Setting this value changes the bandwidth that may be made. By setting the bandwidth to a zero, the request is interrupted as a delete request. When a response is generated using data structure 900, bit error rate 910 and bandwidth 912 are populated with data based on actions taken by the data link manager.

Turning now to FIG. 10, a diagram illustrating a routing query is depicted in accordance with an advantageous embodiment. In this example, routing query 1000 is an example of routing query 324 in FIG. 3. Routing query 1000 includes request identifier 1002 and metric type 1004.

Request identifier 1002 uniquely identifies a routing request generated by topology manager 302 in FIG. 3. Metric type 1004 identifies the type of information desired in the routing table. For example, the metric may be a hop count or a delay.

Figure 11:
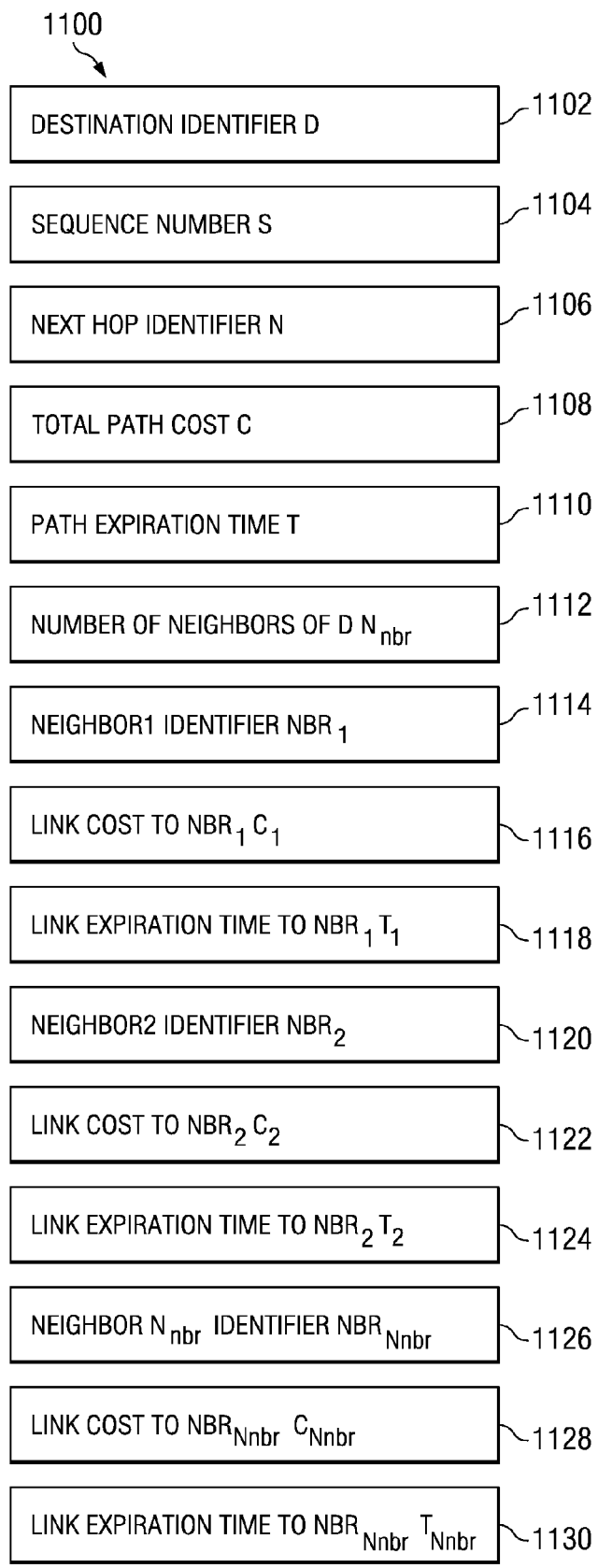
FIG. 11 is an illustration of an entry in a link state table in accordance with an advantageous embodiment.

Turning now to FIG. 11, an illustration of an entry in a link state table is depicted in accordance with an advantageous embodiment. In this example, entry 1100 is an example of an entry that may be found in link state table 328 in FIG. 3.

As illustrated, entry 1100 includes destination identifier D 1102, sequence number S 1104, next hop identifier N 1106, total path cost C 1108, path expiration time T 1110, number of neighbors of D $N_{nbr}$ 1112, neighbor1 identifier $NBR_1$ 1114, link cost to $NBR_1$ $C_1$ 1116, link expiration time to $N_{BR1}$ $T_1$ 1118, neighbor2 identifier $NBR_2$ 1120, link cost to $NBR_2$ $C_2$ 1122, link expiration time to $N_{BR2}$ $T_2$ 1124, neighbor $N_{nbr}$ identifier $NBR_{Nnbr}$ 1126, link cost to $NBR_{Nnbr}$ $C_{Nnbr}$ 1128, and link expiration time to $NBR_{Nnbr}$ $T_{Nnbr}$ 1130.

Destination identifier D 1102 provides the address to a node, which is also referred to as node D. Sequence number S 1104 is an integer that reflects the freshness of the link state.

The topology manager may periodically query the link state table. The sequence number usually starts with 0, and it increases over time. Thus, the higher number indicates newer states. Next, hop identifier N 1106 is an address of the next hop needed to reach the address of the node as identified by destination identifier D 1102. Total path cost C 1108 identifies the total cost from the current node to destination identifier D 1102. Path expiration time T 1110 identifies the minimum expiration of all links along the path from the current node to destination identifier D 1102.

The total number of neighbors of node D 1102 is $N_{nbr}$ 1112. For each of the node D's neighbor (1, 2, . . . $N_{nbr}$), the following information is reported from router module 310 to topology manager 302 in FIG. 3. For example, neighbor 1's identifier is $NBR_1$ 1114, link cost from node D to $NBR_1$ is $C_1$ 1116, expiration time for link between node D and $NBR_1$ is $T_1$ 1118, neighbor 2's identifier is $NBR_2$ 1120, link cost from node D to node $NBR_2$ is $C_2$ 1122, expiration time for link between node D and node $N_{BR2}$ is $T_2$ 1124. Similar information is reported for all the other neighbors of node D until the last neighbor whose identifier is $NBR_{Nnbr}$ 1126, the link cost from node D to node $NBR_{Nnbr}$ is $C_{Nnbr}$ 1128 and the expiration for link between node D and node $NBR_{Nnbr}$ is $T_{Nnbr}$ 1130

With reference to FIG. 12, a diagram of a data structure containing linking guidelines is depicted in accordance with an advantageous embodiment. In this example, data structure 1200 is an example of a linking guideline that may be found in linking guidelines 336 in FIG. 3.

Data structure 1200 includes guideline identifier 1202 and threshold value vector 1204. Guideline identifier 1202 is an integer value that may indicate various conditions. For example, a value of 0 indications signal to noise ratio basis. This basis is an enumeration definition that is understood between topology manager and neighbor discovery module. A value of 1 indicates a number of common neighbor nodes based. A value of 2 indicates a number of initial links to the network. Threshold value vector 1204 contains information about the particular guideline identified by guideline identifier 1202.

Turning now to FIG. 13, a diagram illustrating information about a new link is depicted in accordance with an advantageous embodiment. In this example, data structure 1300 is an example of new link information that may be used to implement new link 334 in FIG. 3. Data structure 1300 includes new neighbor identifier 1302, link cost vector 1304, and link expiration time estimation 1306. New neighbor identifier 1302 identifies the address of the node to which the new link may be made. Link cost vector 1304 includes information, such, for example, bandwidth and bit error rates. Of course, other information may be included, depending on the particular implementation. Link expiration time estimation 1306 indicates when the link may no longer be useable.

Figure 14:
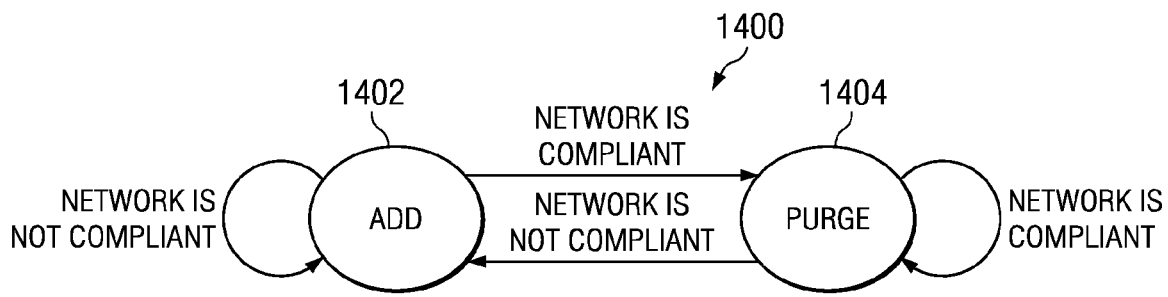
FIG. 14 is a diagram illustrating a state machine for managing links in accordance with an advantageous embodiment.

Turning now to FIG. 14, a diagram illustrating a state machine for managing links is depicted in accordance with an advantageous embodiment. In this example, state machine 1400 is an example of a state machine that may be implemented in topology manager 302 in FIG. 3. This state machine may be used to add and remove links within a network.

In these examples, state machine 1400 may begin and add state 1402. A determination is made as to whether the network is compliant. State machine 1400 remains in add state 1402 as long as the network is not compliant as new links are added. In other words, the topology manager adds links to the set of links until the set of links are unable to meet the performance parameters. When a network is compliant, state machine 1400 then shifts from add state 1402 to purge state 1404.

In purge state 1404, determinations are made as to whether the network is compliant using the performance parameters from the matrices. State machine 1400 remains in purge state 1404 as long as the network is compliant. In purge state 1404, the topology manager removes a selected link from the links until the remaining links are unable to meet the performance parameters. When the network is no longer compliant, state machine 1400 shifts back from purge state 1404 to add state 1402.

In add state 1402, the topology manager attempts to form a number of links in each iteration. The number of links may be selected in various ways. For example, one link may be formed. To save time, the topology manager may form more links if the analysis of the D, T, and K matrices indicates that more links are needed.

In either state, state machine 1400 performs a compliance check. A compliance check involves determining whether the current set of links within the wireless network environment forming the topology meet the parameters set forth in the different matrices received by the topology manager. In particular, the compliance check, in these examples, involves comparing a topology of the network against matrices containing connectivity, diameter, and traffic information.

An identification of hop count for a given topology of links is made using well known procedures. This information is compared against a diameter matrix D specifying the maximum hop count between each pair of nodes. Connectivity identifications for the different links also are identified and compared against connectivity matrix K. This compliance check involves identifying the traffic for the different links and comparing this information with the traffic matrix T for compliance to those specifications.

The identification of traffic may occur using a routing algorithm for every flow in the network counting the number of bits entering and leaving each node in the network. The topology manager may then compute the number of time slots needed to send and receive the data including the associated overhead with each link. If the number of time slots is less than the total available time slots for every node, the traffic is supportable by the network.

In these examples, the decision criteria may use local information about the status of potential links, the matrices, global routing information received from the routing protocol, and link information received from the routing protocol without additional overhead. After the links attempts for an iteration are completed, the process waits to collect link state information from the rest of the network to assess compliance.

The manner in which links are selected may vary, depending on different implementations. In these examples, the selection or decision with respect to links may be made without global information except for the topology and the node location information.

In purge state 1404, the topology manager analyzes each link in the network to determine whether removing a link prevents compliance with the objectives as set forth in the matrices. In these examples, the same information is used by every node in state machine 1400 in making these decisions. As a result, the different nodes should reach the same conclusion in which links may be deleted. The order in which different links are examined may vary depending on the particular implementation, but is the same for all nodes performing the computation in these examples.

Figure 15:
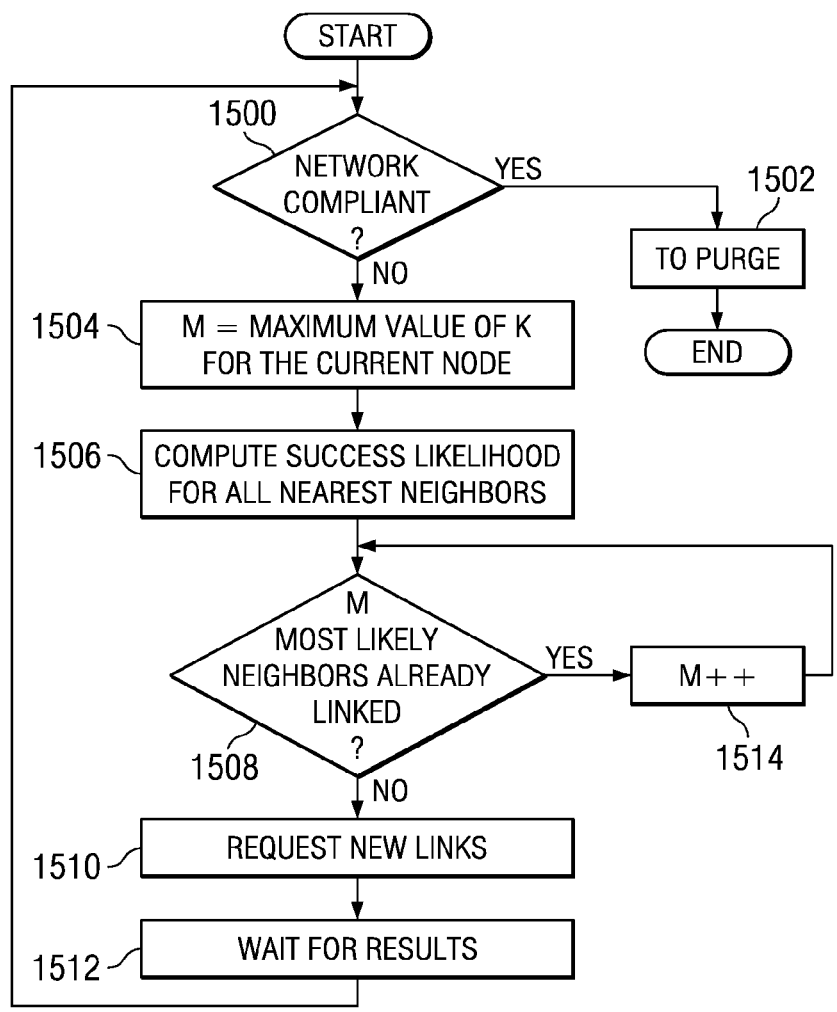
FIG. 15 is a flowchart of a process for an add state in accordance with an advantageous embodiment.

Turning now to FIG. 15, a flowchart of a process for an add state is depicted in accordance with an advantageous embodiment. The process illustrated in FIG. 15 may be used to implement an add state, such as add state 1402 in FIG. 14.

The process begins by determining whether the network is compliant (operation 1500). If the network is not compliant, the process proceeds to a purge state (operation 1502) and terminates. If the network is compliant, then additional nodes are to be added. The process sets M equal to the maximum value of K for the current node (operation 1504). In these examples, K represents the maximum K value that is present for the current node. This K value may be identified by identifying the greatest required number of redundant paths between this node and other nodes from the connectivity matrix K.

The process then computes the likelihood of success for all of the nearest neighbors (operation 1506). A likelihood of success is an assessment of the probability that the link is currently unblocked. This process can incorporate (i) knowledge of the distance between, and relative position of, the nodes; (ii) any terrain information that indicates an obstacle lies between them; (iii) a statistical estimate of the likelihood of an obstacle lying along a path of a given distance; and (iv) the outcome of previous attempts to form a link between the nodes, weighted by the time elapsed since the attempt.

The process in operation 1506 is used to select neighbor nodes. These nodes are the nearest M neighbor nodes with which a blocked line of sight is unlikely. In these examples, the value M may be chosen to be a low value consistent with the minimum number of links that could possibly fulfill the requirements of K, D, and T as set out in a connectivity matrix K, a dynamic matrix D, and a traffic matrix T.

The process evaluates the probability that any potential link is blocked. In the absence of any results from an actual link attempt, the process takes a configurable estimate of the number of blockages per unit length, and estimates the probability that there are no blockages:

$$\text{probability} = \exp(-\text{distance} * \text{blockage\_density}).$$

The distance is the distance between the potentially linked nodes. Blockage density is an estimate of the number of obstacles per unit distance. Blockage density may be different for different types of links, such as air-to-air links or ground-to-ground links.

A determination is then made as to whether M most likely neighbors are already linked to this node (operation 1508). If the M most likely neighbors are not already linked, then new links are requested (operation 1510). In operation 1510, a node is linked to another node when a link has already been established between two nodes. This request links to neighbors not already linked to a node. The process in operation 1510 sends out link requests to the M nodes having the highest probability with which the node does not have a link. Those requests are routed either through the out-of-band control channel or through the directional network. After those requests are resolved, every node waits for the completion of the topology management round, which includes enough time to allow the routing tables to converge.

Link requests in operation 1510 contain information about the node location and available slots. The receiver, at least two mutually available slots are present, responds with two chosen slots and node location, and begins transmitting and listening in the appropriate direction. Upon receipt of the response, the initiating node does the same.

The process then waits for results (operation 1512), and then returns to operation 1500 after the results of the link requests have been received.

With reference again to operation 1508, if the M most likely neighbors are already linked with the current node, then the value of M is incremented (operation 1514), with the process then returning to operation 1508 as described above.

With reference again to operation 1506, when a link request fails, the probability estimate is immediately set to zero. As time passes, the estimate is time-averaged with the probability determination above:

probability_new=$a$*probability_old+(1−$a$)*probability_from_equation where a is a parameter between zero and one. In these examples, a zero indicates that the previous data has no relevance on the blockage probability. A 1 indicates that a static set of node positions and obstacles are present.

Thus, in FIG. 15, if the network is not compliant, the process attempts to form a link with nodes newly chosen to replace previous attempts that proved to have a blocked line of sight. If M links are established and the network is still not compliant, M is increment and the process continues in the add state. If the network is compliant, the network goes to the purge state.

For purposes of clarity, the flowchart in FIG. 15 omits the mechanism for detection when compliance is impossible. After the results of each compliance check, nodes should verify that the requirements are achievable. For instance, a node that, through trial-and-error, discovers that it cannot form enough links to achieve the minimum connectivity requirements, may trigger the actions, such as, for example, inform the network management application that the current requirements are unsupportable, reduces the requirements and disseminates the change to the network, and operate with the new requirements.

Figure 16:
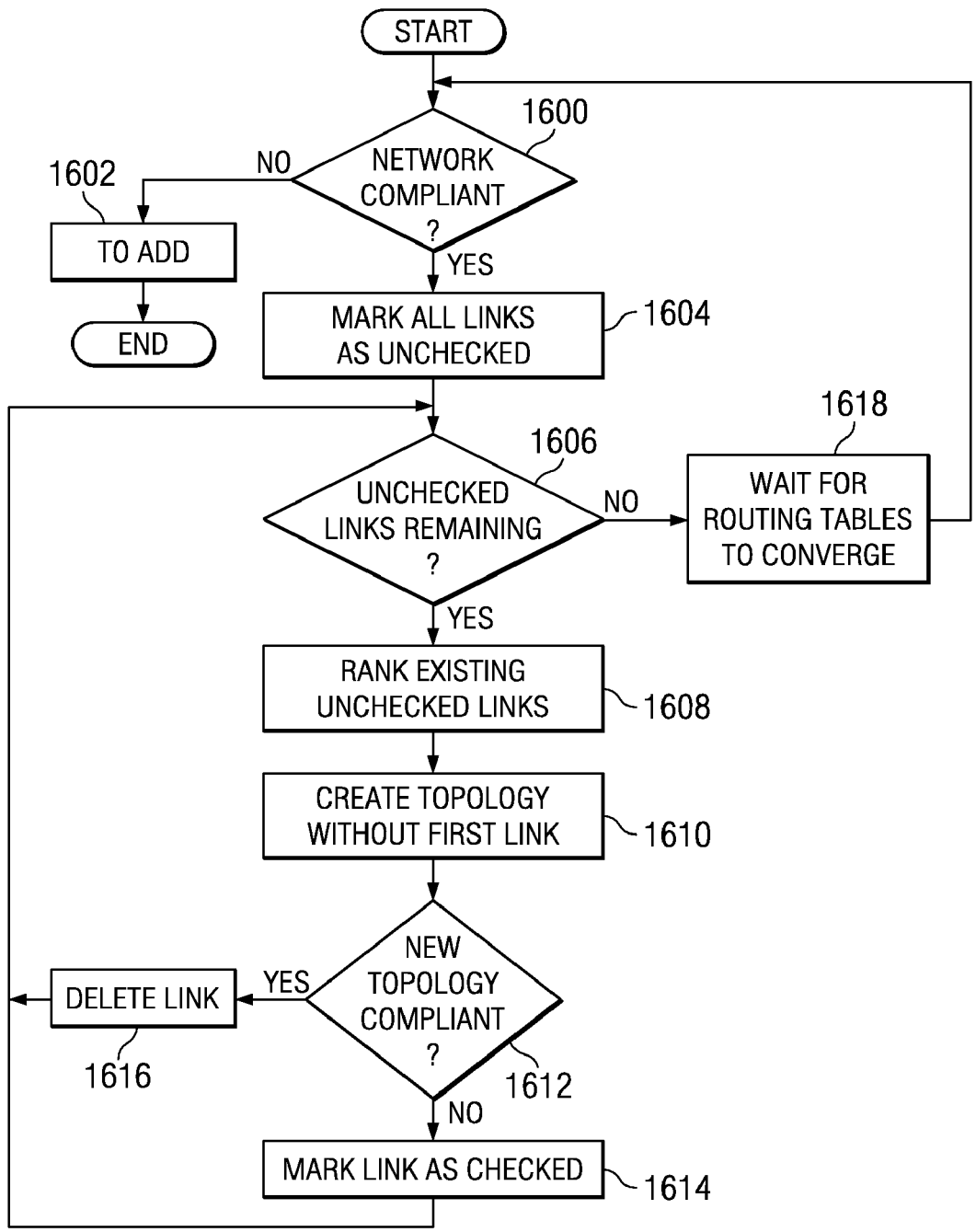
FIG. 16 is a flowchart of a purge state process in accordance with an advantageous embodiment.

With reference now to FIG. 16, a flowchart of a purge state process is depicted in accordance with an advantageous embodiment. The process illustrated in FIG. 16 may be implemented in a purge state for a state machine, such as purge state 1404 in state machine 1400 in FIG. 14.

The process begins by determining whether the network is compliant (operation 1600). The determination in operation 1600 is made by comparing information regarding different links with performance parameters found in the matrices. If the network is not compliant, the process shifts to an add state (operation 1602) and terminates. Otherwise, the process marks all links present as being unchecked (operation 1604).

A determination is made as to whether any unchecked links remain (operation 1606). If additional unchecked links are present, the existing unchecked links are ranked (operation 1608). Thereafter, a topology is created without the first link in the list of links (operation 1610). In other words, the current topology without the link being considered or evaluated is used. A determination is made as to whether this new topology is compliant (operation 1612).

As with operation 1600, the compliance is determined by checking the different links with the matrix in the matrices. If the topology is not compliant, that first link is marked as checked (operation 1614), with the process then returning to operation 1606.

With reference again to operation 1612, if the new topology is compliant, the first link in the list is deleted (operation 1616). The process then returns to operation 1606. Referring back to operation 1606, if unchecked links do not remain, the process then waits for routing tables to converge (operation 1618). The process then returns to operation 1600 as described above.

Figure 17:
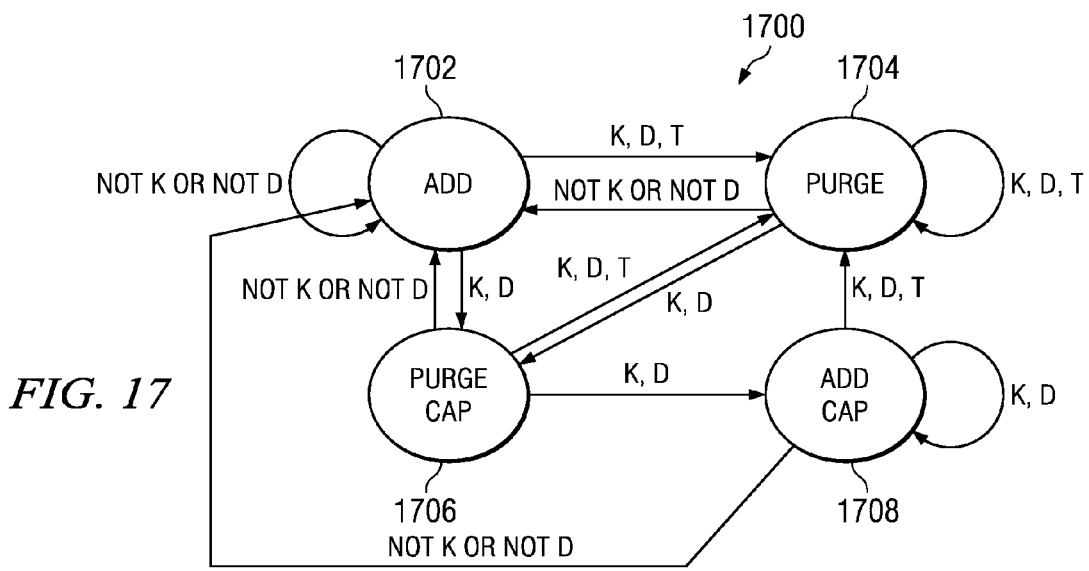
FIG. 17 is a diagram of another state machine for managing links in accordance with an advantageous embodiment.

With reference now to FIG. 17, a diagram of a state machine for managing links is depicted in accordance with an advantageous embodiment. In this example, state machine 1700 is an example of a state machine that may be implemented in a component, such as topology manager 302 in FIG. 3 to manage links in a node. In this example, state machine 1700 includes add state 1702, purge state 1704, purge cap state 1706, and add cap state 1708. State machine 1700 may take into account impacts that additional links may generate.

In the different advantageous embodiments, the process by state machine 1700 does not limit the added links to some optimal set or desired set. Instead, the different nodes in a network are encouraged to make additions using local criteria. Local criteria are information available without further exchange of data with other nodes in the network. This criterion might include information obtained "for free" from other processes like link state from the routing protocol, but imposes no further overhead burdens on the network.

Examples of local criteria are the list of links in the network, the D, K, and T matrices, link attempts by the reference node that have failed and when the failed, and other suitable information. This type of link selection is useful in the different advantageous embodiments because link attempts may fail. With other approaches not used in the advantageous embodiments, the nodes in the network are required to inform their failures so that they no longer rely on node pairs that are unable to fulfill requirements.

When blockages may occur, state machine 1700 may employ add and purge links in a manner that spares the network from reporting widespread link attempt failures across the network. This type of approach may rapidly overshoot the requirement or desired matrix and then converge on a desired solution with respect to links in the network. State machine 1700 may select links that are most likely to increase traffic flow. State machine 1700 may reduce the emphasis on reducing link range while improving an ability to support high traffic loads.

State machine 1700 may begin in add state 1702. State machine 1700 remains in add state 1702 as long as not K or not D are present. In these examples, K represents a redundant number of paths between two nodes. D represents a maximum hop count. One of these variables is present if all nodes meet the performance parameters within the matrix.

For example, K is considered to be present if the number of redundant paths for each pair of nodes within the network are met. If one pair of nodes does not meet the value set for K for that pair of nodes, then K is considered not to be present even if all of the other nodes in the network meet the required redundant paths for the other pairs of nodes. If K, D, and T are present, state machine 1700 shifts to purge state 1704.

As used in these examples, T represents a maximum data rate between two nodes. State machine 1700 remains in purge state 1704 as long as K, D, and T are present. If not K or not D are present, state machine 1700 shifts back to add state 1702 from purge state 1704.

In add state 1702, if K and D are present, state machine 1700 shift into purge cap state 1706. From purge cap state 1706, state machine 1700 shifts to add cap state 1708 if K and D are present. Purge cap state 1706 shifts to purge state 1704 if K, D, and T are present. In purge state 1704, state machine 1700 returns to purge cap state 1706 if K and D are present. In add cap state 1708, state machine 1700 remains in this state along as K and D are present. If not K or not D occurs, state machine 1700 then shift to add state 1702.

In this illustrative example, the behavior of state machine 1700 is similar to that of state machine 1400 in FIG. 14 except that in add state 1702 transitions to purge cap state 1706 if the only matrix is not compliant is traffic matrix T. In purge cap state 1706, traffic supportability is not considered in deleting links. In add cap state 1708, links may be added according to their ability to reduce hop counts of existing flows instead of being based on relative proximity.

Figure 18:
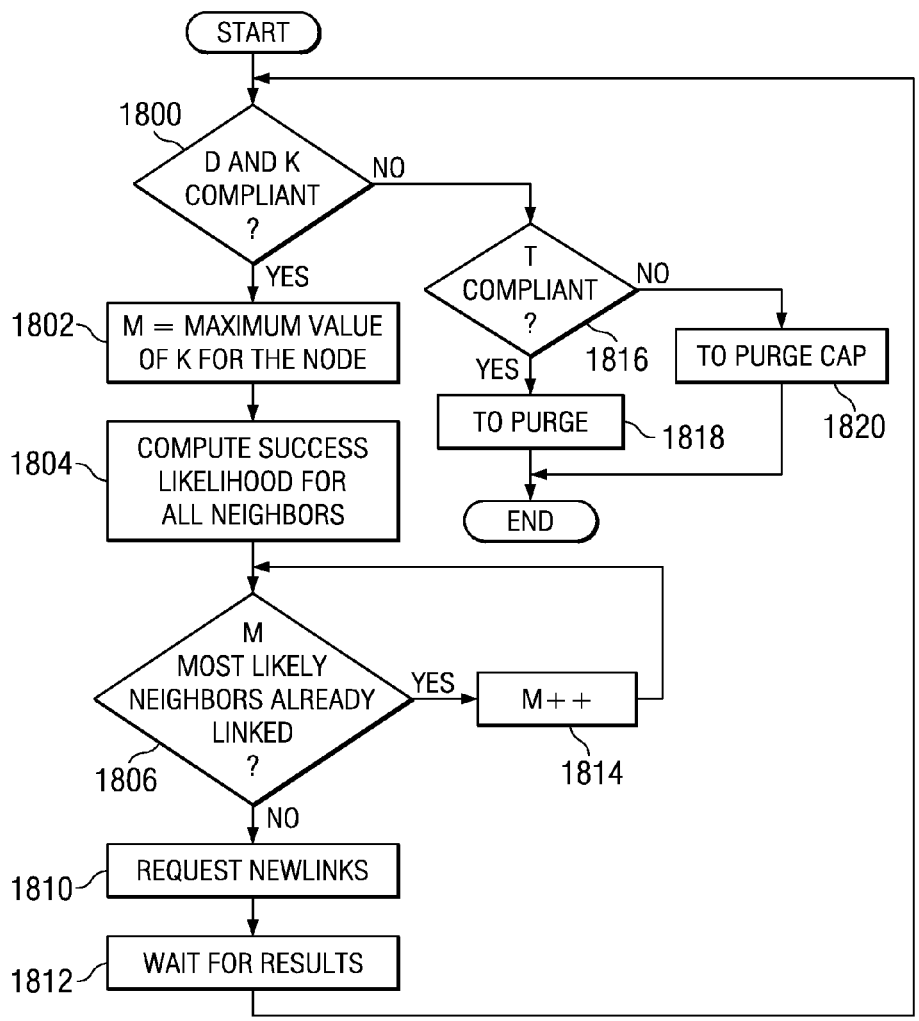
FIG. 18 is a flowchart of a process for an add state in accordance with an advantageous embodiment.

Turning now to FIG. 18, a flowchart of a process for an add state is depicted in accordance with an advantageous embodiment. The process illustrated in FIG. 18 may be implemented in add state 1702 in FIG. 17.

The process begins by determining whether the values for D and K are compliant (operation 1800). This determination involves comparing the values for the maximum hop count, D, and the desired number of redundant paths, K, with the matrix in the matrices for the different nodes.

If D and K are compliant, the variable M is set equal to the maximum value of K for the node on which the process executes (operation 1802). D and K are considered to be compliant if the different node pairs meet the values as specified in the matrices for D and K. The process then computes a success likelihood for all neighbor nodes (operation 1804).

The process then determines whether the M most likely neighbor nodes are already linked (operation 1806). If the M most likely neighbor nodes are not already linked, the process then requests new links (operation 1810). The process then waits for results of the request (operation 1812), with the process then returning to operation 1800 as described above.

In operation 1806, if the M most likely neighbor nodes are not already linked, the value M is incremented (operation 1814). The process then returns to operation 1806 as described above. With reference again to operation 1800, if D and K are not compliant, a determination is made as to whether T is compliant (operation 1816). In these examples, this determination is made by comparing the total traffic flowing from, to, and through the different nodes with the traffic matrix T.

If T is compliant, the process shifts to the purge state (operation 1818), with the process terminating thereafter. T is considered to be compliant if the throughput value set for all the different node pairs are met for all of the node pairs within the network. Otherwise, the process shifts to a purge cap state (operation 1820) with the process terminating thereafter.

Figure 19:
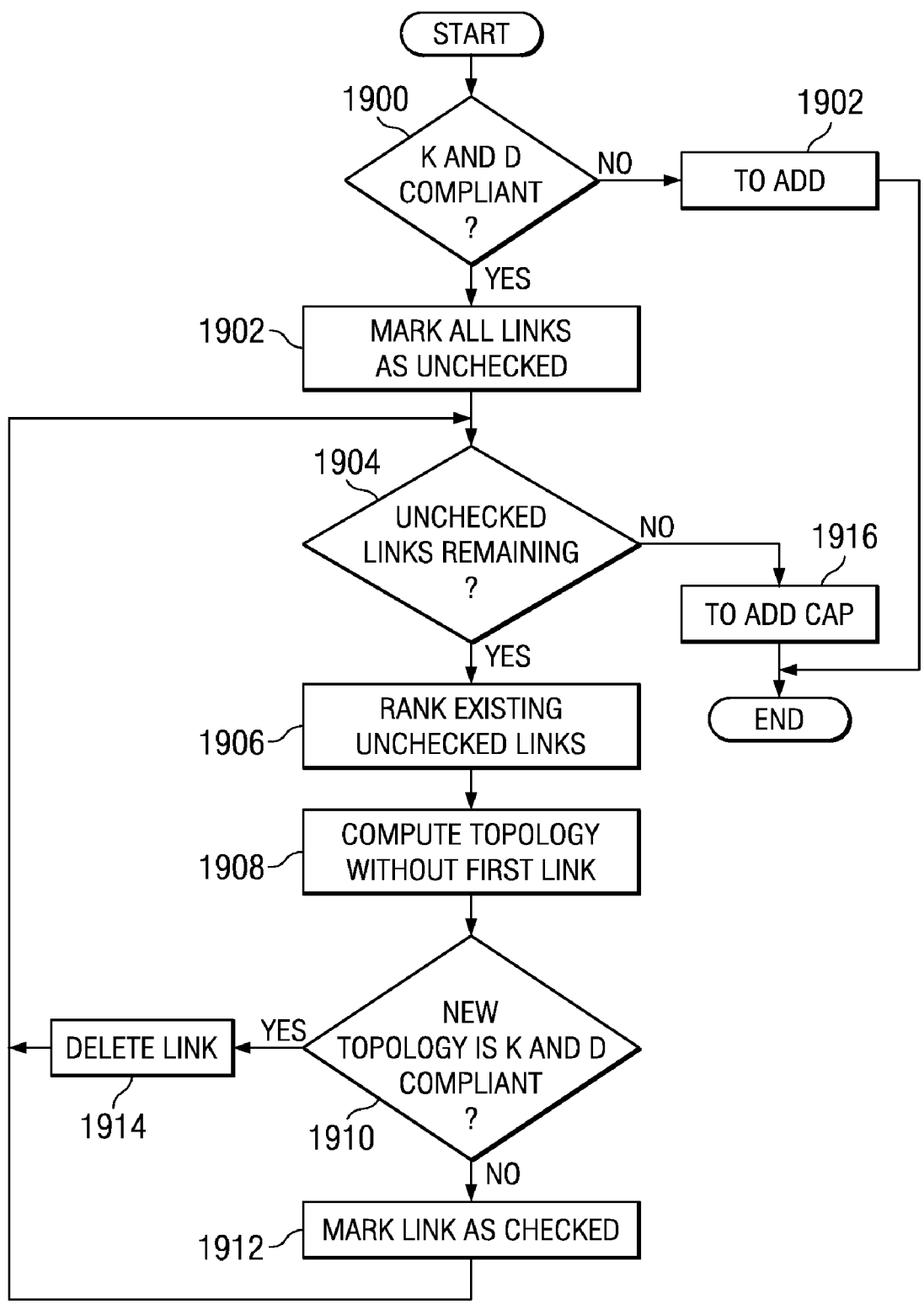
FIG. 19 is a flowchart of a purge cap state in accordance with an advantageous embodiment.

With reference now to FIG. 19, a flowchart of a purge cap state is depicted in accordance with an advantageous embodiment. The process illustrated in FIG. 19 may be implemented as purge cap state 1706 in FIG. 17.

The process begins by determining whether K and D are compliant (operation 1900). If K and D are not compliant, the process proceeds to the add state (operation 1902), with the process terminating thereafter.

If K and D are compliant, all links are marked as unchecked (operation 1902). Next, a determination is made as to whether unchecked links are remaining (operation 1904). If unchecked links are remaining, the existing unchecked links are ranked (operation 1906). The process then computes the topology without the first link in the ranked set of links that are unchecked (operation 1908). A determination is then made as to whether the topology is compliant with respect to values for K and D (operation 1910). If the new topology is not compliant, the first link is marked as checked (operation 1912), with the process then returning to operation 1904 as described above.

With reference again to operation 1910, if the new topology is compliant with respect to K and D, the first link is deleted (operation 1914), with the process then returning to operation 1904 as described above. With reference back to operation 1904, if no unchecked links remain, the process shifts to the add cap state (operation 1916), with the process terminating thereafter.

Figure 20:
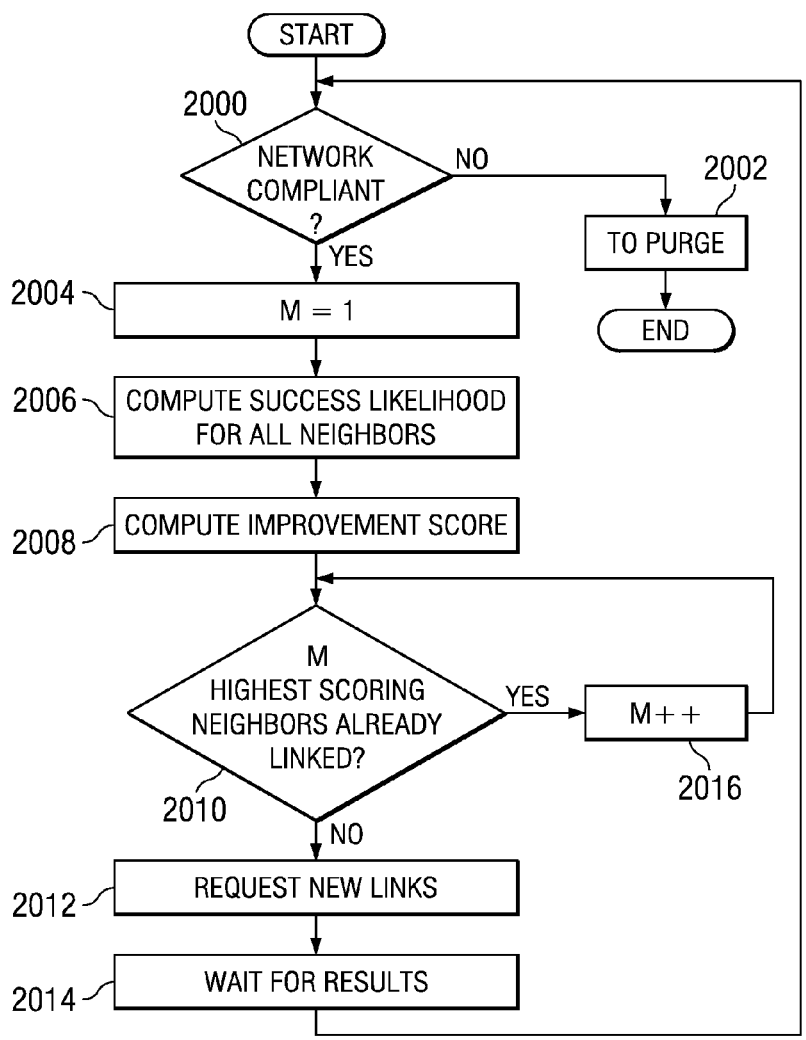
FIG. 20 is a flowchart of a process for an add cap state in accordance with an advantageous embodiment.

With reference now to FIG. 20, a flowchart of a process for an add cap state is depicted in accordance with an advantageous embodiment. The process illustrated in FIG. 20 may be implemented in add cap state 1708 in FIG. 17.

The process begins by determining whether the network is compliant (operation 2000). If the network is not complaint, the process proceeds to the purge state (operation 2002), with the process terminating thereafter. If the network is compliant with respect to all of the matrix, the process then sets the value for the variable M equal to one (operation 2004). The process then computes the success likelihood for all neighbors (operation 2006).

Next, an improvement score is computed (operation 2008). In these examples, potential links are ranked by an improvement score. This score examines each potential neighbor, postulates a link existing between the two nodes, and then identifies or predicts a change in hop count of each flow in the network. For each flow that experiences a reduction in hop count, the network multiplies the hop reduction by the intensity of the flow from the T matrix. A flow is the traffic between a specific source/destination pair. The intensity of the flow is characterized as the number of bits per second. This value is then multiplied by the estimated blockage probability above. The result, known as the improvement score, is the expected number of bytes not transmitted as a result of the link attempt:

Score=sum_over_all_flows(max(hops_old−hops_new,
0)*flow_intensity)*probability.

The process then determines whether the M highest scoring neighbors are already linked (operation 2010). If the M highest scoring neighbors are not already linked, then new links are requested (operation 2012). The process then waits for results from the request for the links (operation 2014), with the process then returning to operation 2000 as described above.

With reference again to operation 2010, if the M highest scoring neighbors are already linked, the process increments the value M by one (operation 2016), with the process then returning to operation 2010 as described above.

Figure 21:
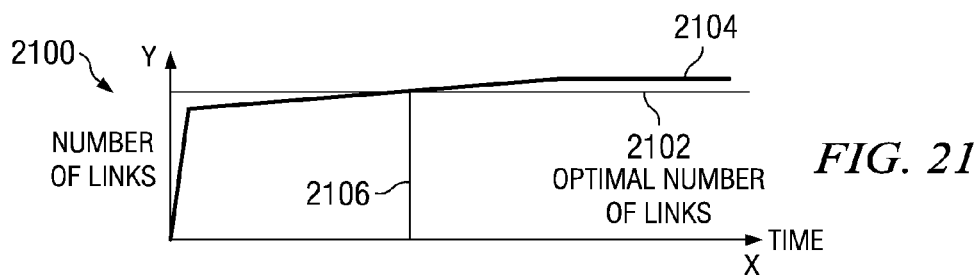
FIG. 21 is a diagram illustrating a conventional approach for optimizing links in a wireless network in accordance with an advantageous embodiment.

With reference now to FIG. 21, a diagram illustrating a conventional approach for optimizing links in a wireless network is depicted. In this example, in graph 2100, the number of links is shown on the Y axis while time is shown on the X axis. Line 2102 illustrates the optimal number of links. Line 2104 illustrates the generation of links—over time using known approaches for optimizing links in a network.

As can be seen in this example, the optimal number of links is not reached until the time at point 2106. The different advantageous embodiments recognize that this approach to convergence adds links in a more conservative manner. As a result, if some of the link attempts fail, more time may occur before a solution is found to reach or exceed the number of optimal links.

Figure 22:
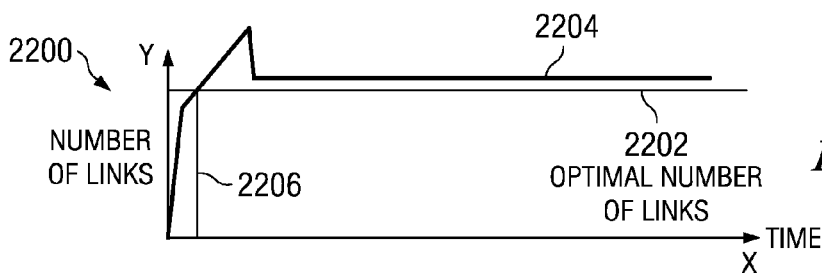
FIG. 22 is a diagram illustrating the generation of links using a process in accordance with an advantageous embodiment.

With reference now to FIG. 22, a diagram illustrating the generation of links using a process in accordance with an advantageous embodiment is depicted. In this example, the number of links is shown on the Y axis while time is shown in the X axis in graph 2200. Line 2202 illustrates the optimal number of links and has the same value as line 2102 in FIG. 21. Line 2204 illustrates the number of links over time. As can be seen, the optimal number of links is reached at the time at point 2206. In this example, the processes used in the advantageous embodiments quickly overshoot line 2202 as seen in line 2204 and then converge to line 2202. As can be seen, the optimal number of links is reached more quickly relative to the process illustrated in FIG. 21.

The different advantageous embodiments provide a more aggressive addition of links than currently used processes. Further, the different embodiments also incorporate information about link attempts that have failed as well as allowing the setting of precise service requirements. Further, the different advantageous embodiments also take into account that unknown line of sight conditions may occur. The different advantageous embodiments recognize that current solutions slowly build toward a compliance solution.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A directional link management system comprising:
   a network manager, wherein the network manager is capable of providing a set of performance parameters for a wireless network in which directional links are used by a plurality of nodes in the wireless network;
   a router, wherein the router is capable of routing information to neighbor nodes within the plurality of nodes and is capable of providing information about links between the plurality of nodes in the wireless network environment;
   a situational awareness database, wherein the situational awareness database stores information about nodes;
   a neighbor discovery module capable of detecting a presence of a new node in addition to the plurality of nodes;
   a topology manager, wherein the topology manager is capable of identifying a set of links for a node with a set of nodes using the set of performance parameters, information about the links, and information about the nodes to form a set of identified links, wherein the topology manager has a plurality of states of operation comprising:
      an add state in which the topology manager adds a new link to the set of identified links until the set of identified links are able to meet the set of performance parameters;
      a purge state in which the topology manager removes a selected link from the set of identified links until the set of identified links are able to meet the set of performance parameters, wherein the topology manager shifts from the add state to the purge state if all of the set of performance parameters are met, and wherein the topology manager shifts from the purge state to the add state when a number of redundant paths between the nodes and a maximum hop count between the nodes are absent, while a desired throughput between the nodes in the set of performance parameters is met;
      a purge cap state in which the topology manager ranks a set of existing links, removes a candidate link from the set of existing links to form a new set of links, determines whether the new set of links is compliant with the number of redundant paths between the nodes and the maximum hop count between the nodes in the set of performance parameters, and deletes the candidate link if the new set of links is compliant with the number of redundant paths between the nodes and the maximum hop count between the nodes in the set of performance parameters, wherein the topology manager shifts from the add state to the purge cap state when the number of redundant paths between the nodes and the maximum hop count between the nodes are met while the desired throughput between the nodes is absent in the set of performance parameters, wherein the topology manager shifts from the purge state to the purge cap state when the number of redundant paths between the nodes and the maximum hop count between the nodes are met, while a desired throughput between the nodes is absent in the set of performance parameters, and wherein the topology manager shifts from the purge cap state to the add state when the number of redundant paths between the nodes and the maximum hop count between the nodes are absent, while the desired throughput between the nodes in the set of performance parameters is met; and
      an add cap state in which the topology manager ranks a set of potential links between the nodes and selects the new link as one providing a highest improvement score from the set of potential links outside of the set of identified links, wherein the topology manager shifts from the add cap state to the purge state when all of the set of performance parameters are absent, wherein the topology manager shifts from the add cap state to the add state when the number of redundant paths between the nodes and the maximum hop count between the nodes are absent, while the desired throughput between the nodes in the set of performance parameters is met, and wherein the topology manager shifts from the purge cap state to the add cap state when the number of redundant paths between the nodes and the maximum hop count between the nodes are met while the desired throughput between the nodes is absent in the set of performance parameters; and
   a data link manager, wherein the data link manager is capable of managing the set of identified links.

2. The directional link management system of claim 1, wherein the data link manager manages the set of identified links by establishing the set of identified links.

3. The directional link management system of claim 2, wherein the data link manager manages the set of identified links by changing bandwidth for a selected link within the set of identified links.

4. The directional link management system of claim 3, wherein the data link manager manages the set of identified links by deleting a particular link within the set of identified links.

5. The directional link management system of claim 1, wherein the topology manager identifies the set of links by selecting links to nodes that meet the set of performance parameters that can be reached by a node.

6. The directional link management system of claim 1, wherein the set of performance parameters comprises the number of redundant paths between the nodes, the maximum hop count between the nodes, and the desired throughput between the nodes.

7. The directional link management system of claim 1, wherein the situational awareness database stores terrain information used by the topology manager to manage a set of directional links.

8. The directional link management system of claim 1, wherein the plurality of nodes comprises at least one of aircraft, ground vehicles, and ships.

9. An apparatus comprising:
a node;
a topology manager executing on the node, wherein the topology manager is capable of identifying a set of links for the node with a set of neighbor nodes using a set of performance parameters, information about links, and information about nodes to form a set of identified links, wherein the topology manager has a plurality of states of operation comprising:
an add state in which the topology manager adds a new link to the set of identified links until the set of identified links are able to meet the set of performance parameters;
a purge state in which the topology manager removes a selected link from the set of identified links until the set of identified links are able to meet the set of performance parameters, wherein the topology manager shifts from the add state to the purge state if all of the set of performance parameters are met, and wherein the topology manager shifts from the purge state to the add state when a number of redundant paths between the nodes and a maximum hop count between the nodes are absent, while a desired throughput between the nodes in the set of performance parameters is met;
a purge cap state in which the topology manager ranks a set of existing links, removes a candidate link from the set of existing links to form a new set of links, determines whether the new set of links is compliant with the number of redundant paths between the nodes and the maximum hop count between the nodes in the set of performance parameters, and deletes the candidate link if the new set of links is compliant with the number of redundant paths between the nodes and the maximum hop count between the nodes in the set of performance parameters, wherein the topology manager shifts from the add state to the purge cap state when the number of redundant paths between the nodes and the maximum hop count between the nodes are met while the desired throughput between the nodes is absent in the set of performance parameters, wherein the topology manager shifts from the purge state to the purge cap state when the number redundant paths between the nodes and the maximum hop count between the nodes are met, while a desired throughput between the nodes is absent in the set of performance parameters, and wherein the topology manager shifts from the purge cap state to the add state when the number redundant paths between the nodes and the maximum hop count between the nodes are absent, while the desired throughput between the nodes in the set of performance parameters is met; and
an add cap state in which the topology manager ranks a set of potential links between the nodes and selects the new link as one providing a highest improvement score from the set of potential links outside of the set of identified links, wherein the topology manager shifts from the add cap state to the purge state when all of the set of performance parameters are absent, wherein the topology manager shifts from the add cap state to the add state when the number redundant paths between the nodes and the maximum hop count between the nodes are absent, while the desired throughput between the nodes in the set of performance parameters is met, and wherein the topology manager shifts from the purge cap state to the add cap state when the number of redundant paths between the nodes and the maximum hop count between the nodes are met while the desired throughput between the nodes is absent in the set of performance parameters; and
a data link manager executing on the node, wherein the data link manager is capable of managing the set of identified links identified by the topology manager.

10. The apparatus of claim 9, wherein the set of links are directional links.

11. The apparatus of claim 9, wherein the topology manager further operates the add state to evaluate the probability that a potential link is blocked by taking a configurable estimate of the number of blockages per unit length and estimating the probability that there are no blockages using the following algorithm:

$$\text{probability} = \exp(-\text{distance} \times \text{blockage density}),$$

wherein the distance is a distance between potentially linked nodes, and wherein the blockage density is an estimate of a number of obstacles per unit distance.

12. The apparatus of claim 9, wherein the set of wherein the set of performance parameters comprises a number of redundant paths between the nodes, a maximum hop count between the nodes, and a desired throughput between the nodes.

13. The apparatus of claim 9, wherein the node is selected from one of an aircraft, a ground vehicle, and a ship.

14. A computer implemented method for managing links, the computer implemented method comprising:
responsive to receiving a set of performance parameters, adding, by a topology manager executing on a processor unit, a link to a set of links until the set of links meets the set of performance parameters, wherein the set of performance parameters comprises a number of redundant paths between nodes, a maximum hop count between the nodes, and a desired throughput between the nodes; and
responsive to all of the performance parameters in the set of performance parameters being met by the set of links, removing a selected link from the set of links until the set of links are able to meet the set of performance parameters, wherein the topology manager shifts from adding to removing if all of the set of performance parameters are met, and wherein the topology manager shifts from removing to adding when a number of redundant paths between the nodes and a maximum hop count between the nodes are absent, while a desired throughput between the nodes in the set of performance parameters is met;
ranking, by the topology manager, a set of existing links and removing a candidate link from the set of existing links to form a new set of links;
determining whether the new set of links is compliant with the number of redundant paths between the nodes and the maximum hop count between the nodes in the set of performance parameters and deleting the candidate link if the new set of links is compliant with the number of redundant paths between the nodes and the maximum hop count between the nodes in the set of performance parameters, wherein the topology manager shifts from adding to ranking when the number of redundant paths between the nodes and the maximum hop count between the nodes are met while the desired throughput between the nodes is absent in the set of performance parameters, wherein the topology manager shifts from the removing to ranking the set of existing links when the number of redundant paths between the nodes and the maximum hop count between the nodes are met, while a desired throughput between the nodes is absent in the set of performance parameters, and wherein the topology manager shifts from ranking the set of existing links to adding when the number of redundant paths between the nodes and the maximum hop count between the nodes are absent, while the desired throughput between the nodes in the set of performance parameters is met; and ranking a set of potential links between the nodes and selecting the new link as one providing a highest improvement score from the set of potential links outside of the set of identified links, wherein the topology manager shifts from ranking the set of potential links to ranking the set of existing links when all of the set of performance parameters are absent, wherein the topology manager shifts from ranking the set of potential links to adding when the number redundant paths between the nodes and the maximum hop count between the nodes are absent, while the desired throughput between the nodes in the set of performance parameters is met, and wherein the topology manager shifts from the ranking the set of existing links to ranking the set of potential links when the number of redundant paths between the nodes and the maximum hop count between the nodes are met while the desired throughput between the nodes is absent in the set of performance parameters.

15. The computer implemented method of claim 14, wherein the set of performance parameters comprises the number of redundant paths between nodes, the maximum hop count between the nodes and the desired throughput between the nodes.

16. A computer program product having program code stored on a non-transitory computer readable storage medium for managing links, the program code executed by a computer to:

responsive to receiving a set of performance parameters, add a link to a set of identified links until the set of identified links meets the set of performance parameters; and responsive to all of the performance parameters in the set of performance parameters being met by the set of identified links, remove a selected link from the set of identified links until the set of performance parameters are no longer met, wherein the program code shifts from adding to removing if all of the set of performance parameters are met, and wherein the program code shifts from removing to adding when a number of redundant paths between the nodes and a maximum hop count between the nodes are absent, while a desired throughput between the nodes in the set of performance parameters is met;

rank a set of existing links and removing a candidate link from the set of existing links to form a new set of links;

determine whether the new set of links is compliant with the number of redundant paths between the nodes and the maximum hop count between the nodes in the set of performance parameters and delete the candidate link if the new set of links is compliant with the number of redundant paths between the nodes and the maximum hop count between the nodes in the set of performance parameters, wherein the program code shifts from adding to ranking when the number of redundant paths between the nodes and the maximum hop count between the nodes are met while the desired throughput between the nodes is absent in the set of performance parameters, wherein the program code shifts from the removing to ranking the set of existing links when the number of redundant paths between the nodes and the maximum hop count between the nodes are met, while a desired throughput between the nodes is absent in the set of performance parameters, and wherein the program code shifts from ranking the set of existing links to adding when the number of redundant paths between the nodes and the maximum hop count between the nodes are absent, while the desired throughput between the nodes in the set of performance parameters is met; and rank a set of potential links between the nodes and select the new link as one providing a highest improvement score from the set of potential links outside of the set of identified links, wherein the program code shifts from ranking the set of potential links to ranking the set of existing links when all of the set of performance parameters are absent, wherein the program code shifts from ranking the set of potential links to adding when the number redundant paths between the nodes and the maximum hop count between the nodes are absent, while the desired throughput between the nodes in the set of performance parameters is met, and wherein the program code shifts from the ranking the set of existing links to ranking the set of potential links when the number of redundant paths between the nodes and the maximum hop count between the nodes are met while the desired throughput between the nodes is absent in the set of performance parameters.

17. The computer program product of claim 16, wherein the set of performance parameters comprises the number of redundant paths between nodes, the maximum hop count between the nodes, and the desired throughput between the nodes.

* * * * *